Figure 6:
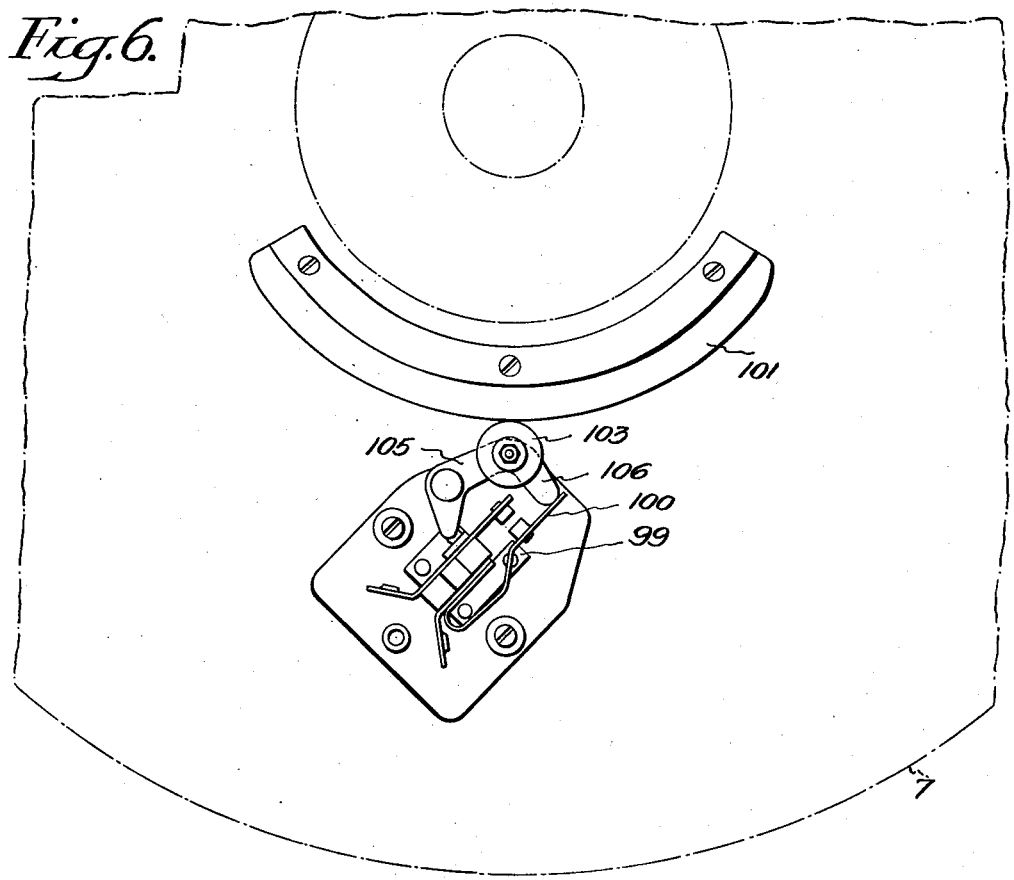

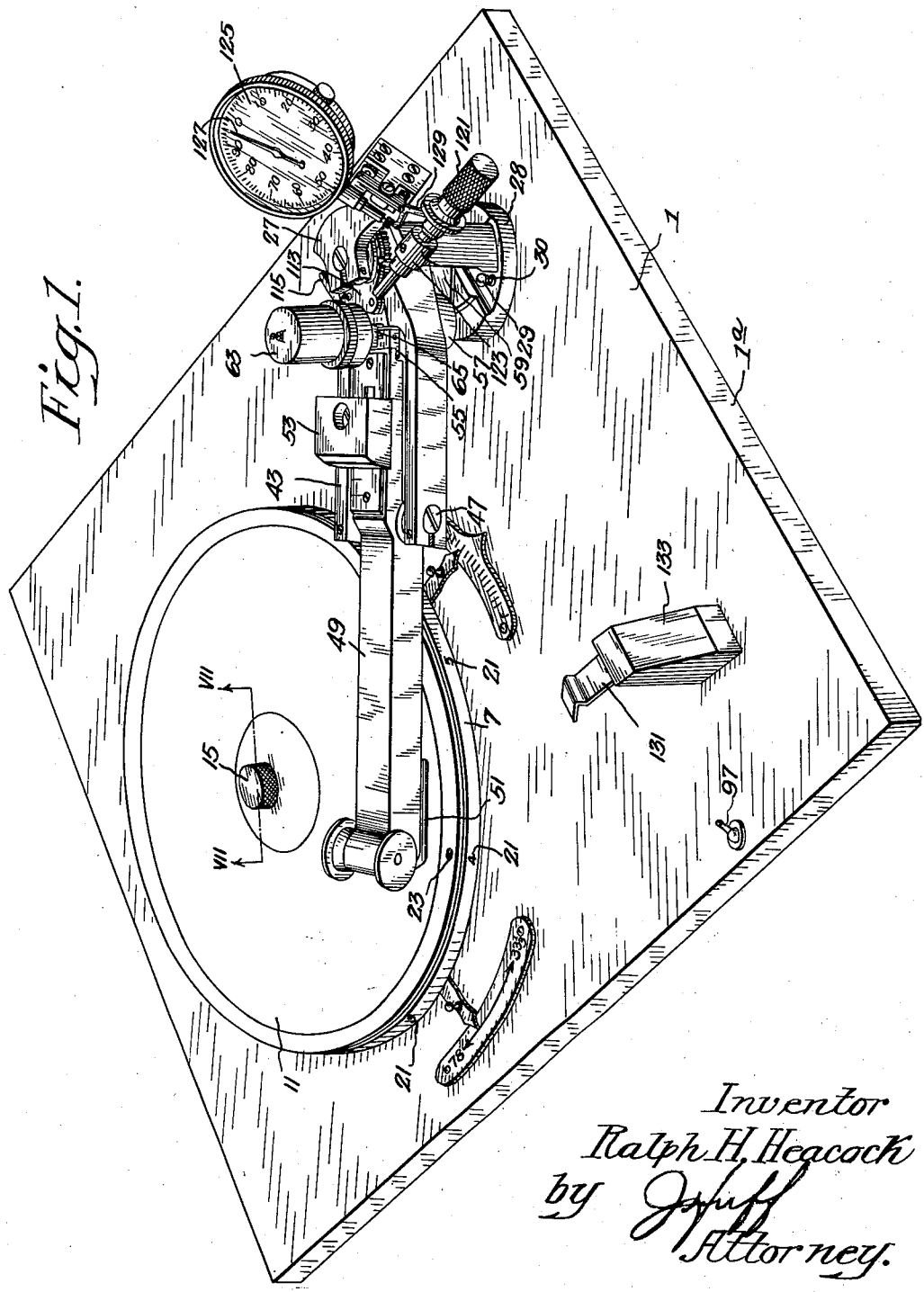

Nov. 1, 1938.  R. H. HEACOCK  2,135,035
PHONOGRAPH
Filed Feb. 29, 1936  4 Sheets-Sheet 2
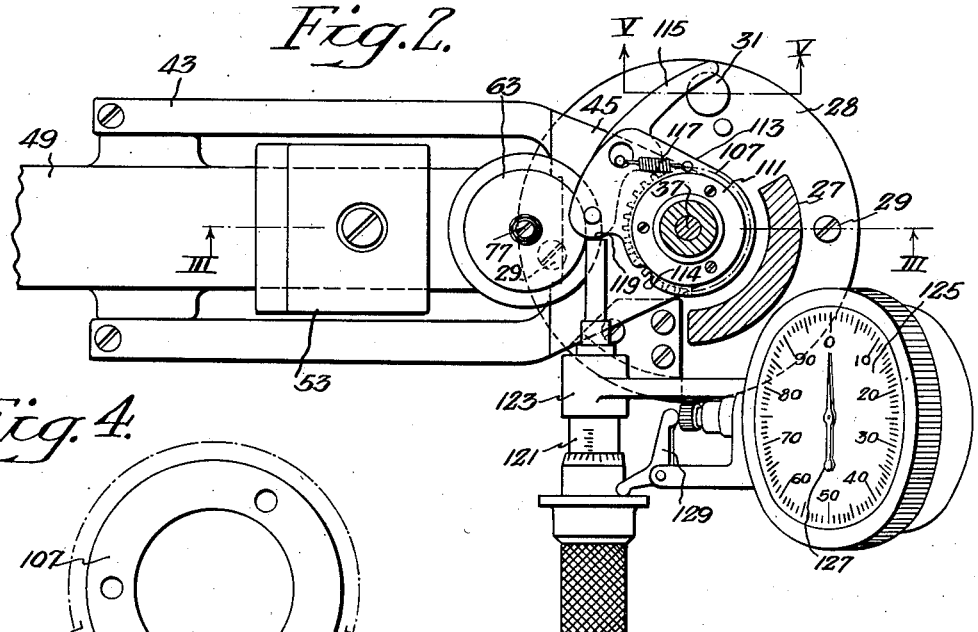
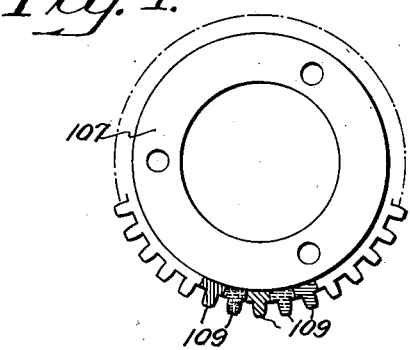
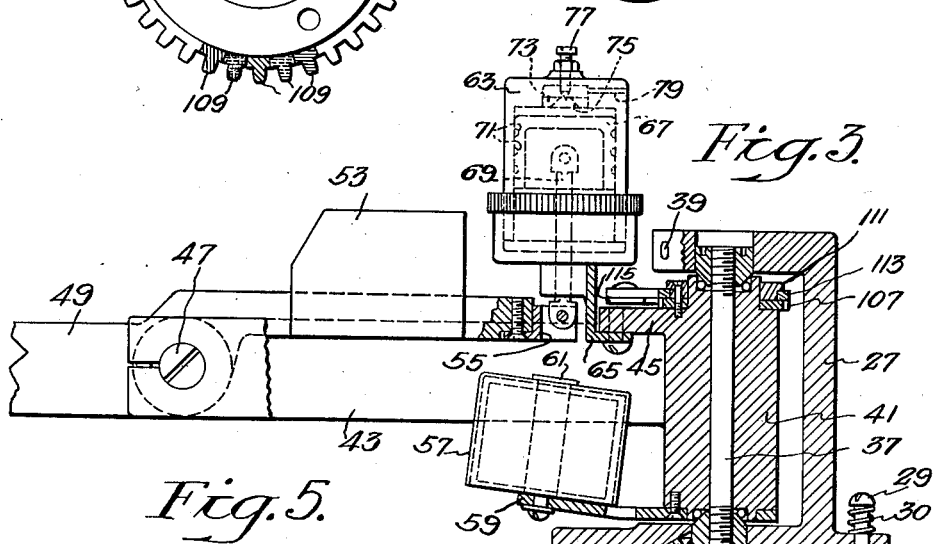
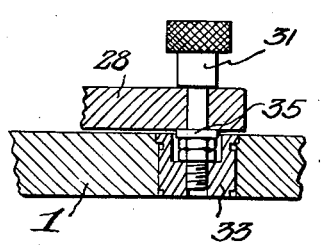
Inventor
Ralph H. Heacock
by Huff
Attorney.

Nov. 1, 1938.    R. H. HEACOCK    2,135,035
PHONOGRAPH
Filed Feb. 29, 1936    4 Sheets-Sheet 3

Inventor
Ralph H. Heacock
by
Attorney.

| TOPIC TO BE SELECTED | INDEX ON TURNTABLE. | INDEX GEAR COLOR | INDICATION ON MICROMETER GAUGE |
|---|---|---|---|
| THE AIR IS | 2 | GREEN | 160 |
| THE CORRECT TIME IS | 8 | SILVER | 25 |
| AN IMPORTANT PART IS | 4 | RED | 255 |
| YOUR ANNOUNCER IS M.J.C. | 6 | BLUE | 75 |
| HIGH LIGHTS OF TO-DAYS' NEWS | 5 | YELLOW | 125 |
| JOHN DOES' ORCHESTRA | 3 | GREEN | 15 |

Inventor
Ralph H. Heacock
by [signature]
Attorney.

Patented Nov. 1, 1938

2,135,035

UNITED STATES PATENT OFFICE 2,135,035

PHONOGRAPH

Ralph H. Heacock, Oaklyn, N. J., assignor to Radio Corporation of America, a corporation of Delaware Application February 29, 1936, Serial No. 66,352

17 Claims. (Cl. 274—9)

This invention relates to phonographs, and more particularly to means for insuring the location of the record scanning element upon the record at the exact point or points from which it is desired to have reproduction started.

Under certain circumstances, it is necessary to reproduce from a sound record a desired sound or series of sounds which have been recorded intermediate the ends of the record. For example, in radio broadcasting, it frequently is necessary to reproduce the beating of a horse's hoofs, the pealing of thunder, the crackling of fire, the pouring of rain, and many similar sounds which can be simulated by numerous relatively simple devices. However, for more complex sounds, this becomes very difficult and the most practical way to introduce them in a broadcast is by reproduction from an already existing phonograph record. Thus, in broadcasting a scene involving a fire, for instance, a record on which the roaring of motors, the screaming of sirens and the yells of the excited crowds have been previously recorded is cut in immediately following one of the actor's cries of "Fire" to produce the natural background and color characteristic of the scene. Obviously, it is essential that the proper portion of the record should be selected from which reproduction of the desired subject matter is to be obtained. Again, it is often desirable, in dubbing from an existing record onto a new record, to take off from the old record only certain sounds or sound effects for recording onto the new record. The same is also true where the sound is reproduced through an automatic announce system, as in advertising, for example. In all these and numerous other similar instances, the necessity of locating the pickup device at the exact point on the record where the word or sound first to be reproduced is located is apparent, and it is the primary object of my invention to provide a sound selecting mechanism which will accomplish this result.

Heretofore, a number of attempts have been made to provide devices of this sort in connection with disc records. So far as I am aware, however, these devices have only been accurate to within several grooves of the desired groove, and the selection of the proper groove, and particularly the proper point in that groove from which reproduction is to start, has been largely a matter of chance. It is, therefore, a more specific object of my invention to provide improved means, in a phonograph of this type, whereby the exact point in a desired groove corresponding to a predetermined word or sound may be accurately selected.

Another object of my invention is to provide improved indexing mechanism in a phonograph of the type set forth whereby each sound recorded on a record may be properly indexed and the customary hunting therefor consequently eliminated.

Still another object of my invention is to provide improved indexing mechanism in a phonograph of the type set forth whereby the record may be indexed to fractions of a turn and any desired portion of a single turn or convolution of the sound groove thus accurately located.

A further object of my invention is to provide improved record centering means whereby the spirally grooved record may be accurately centered with respect to both the indexing and the scanning mechanisms.

Still a further object of my invention is to provide, in a phonograph, improved means for controlling the location of the record scanning device with respect to the record.

It is also an object of my invention to provide, in a phonograph, improved means for controlling the engagement of the scanning device with the record.

Another object of my invention is to provide improved indexing means and scanning device controlling means as aforesaid which is simple in construction and inexpensive of manufacture, which can readily be applied to existing, conventional phonographs, and which, above all, is highly efficient in use.

In accordance with my invention, I provide the phonograph with a micrometer toward the head of which the pick-up arm is slightly biased by gravity, a pawl or pawl carrying member associated with the pick-up arm being arranged to contact the micrometer head and thus determine the position of the pick-up arm. Associated with the pawl is a gear having a plurality of variously colored indicating teeth or segments by means of which a main, partial setting may be obtained, while a secondary or vernier setting is obtained with the micrometer, a reference mark on the record being used for adjusting the record circumferentially with respect to indicia on the turntable periphery to obtain adjustment within a single turn of the sound groove. The pickup arm is normally held in raised position above the plane of the record by a normally energized electromagnet the circuit of which is controlled by two switches in parallel, one a manually operable switch and the other a turntable controlled switch. It is only when both switches are open that the electromagnet releases the pickup arm to permit it to descend onto the record by gravity and under the control of a dash-pot device. To insure proper centering of the record with respect to the pick-up and the indexing mechanism by taking up any play between the record center hole and the turntable spindle, the record is coupled to the turntable by means of a tapered centering pin. It will be noted that since gravity is depended upon for both biasing the pick-up arm toward the micrometer head and for causing the pick-up to descend onto the record entirely without the use of catches or latches, there is no possibility of the mechanism sticking or jamming, and it is always free to work efficiently.

The novel features that I consider characteristic of my invention are set forth with particularity in the appended claims. The invention itself, however, both as to its organization and method of operation, together with additional objects and advantages thereof, will best be understood from the following description of a specific embodiment thereof, when taken in connection with the accompanying drawings in which—

Figure 7:
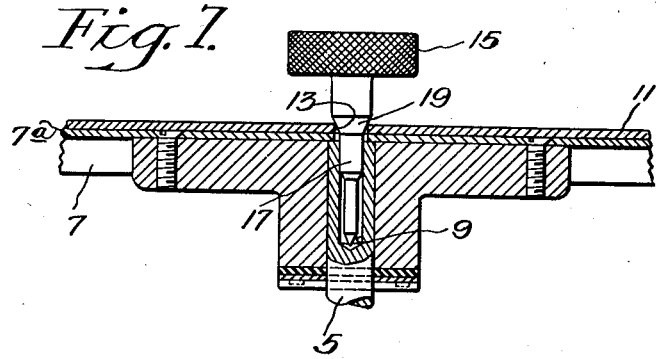
Figures 8, 9:
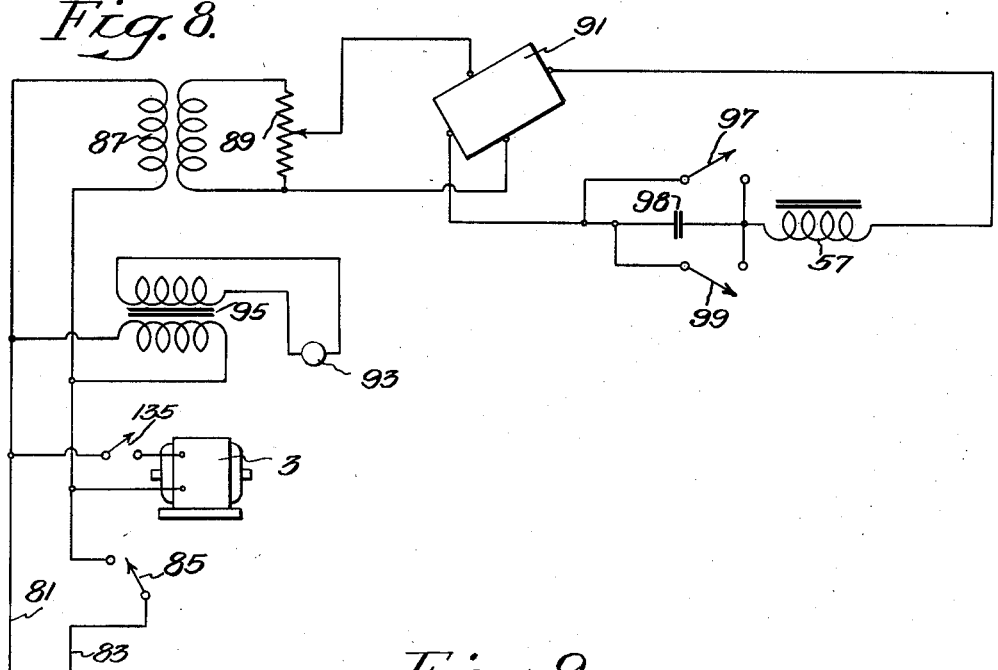

Figure 1 is a perspective view of a phonograph having my present invention incorporated therein, Figure 2 is an enlarged, fragmentary, plan view showing the details of the relation between the pick-up arm, the main indicating gear, the pawl and its mounting plate, the micrometer and the micrometer gauge, Figure 3 is a sectional view taken on the line III—III of Figure 2, Figure 4 is an enlarged plan view of the main indicating gear showing the colored teeth or segments thereof, Figure 5 is a sectional view taken on the line V—V of Figure 2, Figure 6 is a detail plan view of one of the switches in the electro-magnet circuit and shows the relation thereto of the turntable carried controlling cam therefor, Figure 7 is an enlarged sectional view taken on the line VII—VII of Figure 1, Figure 8 is a wiring diagram showing the details of the electromagnet circuit, and Figure 9 illustrates a representative index chart used in connection with my invention.

Referring more specifically to the drawings, wherein similar reference characters designate corresponding parts throughout, there is shown a motor board 1 which supports a motor 3 (Fig. 8) for driving a turntable spindle 5 (Fig. 7) upon which is mounted a turntable 7. The upper end of the spindle 5 is bored, as shown at 9, and terminates below the surface 7a of the turntable upon which is supported a spirally grooved disc record 11 having a center hole 13 axially aligned with the bore 9. A pin 15 which has a cylindrical portion 17 adapted to frictionally fit into the bore 9 and a tapered portion 19 adapted to frictionally engage the edge of the record defining the opening 13 locks the record to the turntable 7 and the spindle 5 and fixes it with respect to the mechanism hereinafter described. It will be noted that the turntable is provided on its periphery with a plurality of substantially evenly spaced, circumferentially distributed indicia 21 (Fig. 1), such as numerals, while the record is provided with a marking 23, such as a colored spot. By loosening the locking pin 15, the record 11 may be adjusted circumferentially on the turntable and its mark 23 set opposite any one of the indicia 21 or between any two of them for a purpose also presently to be set forth, after which the pin 15 may be depressed to lock the record in place.

Supported on the upper surface of the motor board 1 and spaced therefrom by a plurality of washers 25 is a supporting bracket 27 through the base 28 of which extend a pair of screws 29 which are screwed into the motor board 1. The screws 29 are spaced apart approximately 120° and a coil spring 30 is inserted around each screw between its head and the base 28. This construction permits tilting of the bracket member 27 and the structure supported thereby. For tilting the bracket 27, there is provided a third screw 31 (Fig. 5) which is threaded into a metal inset 33 in the motor board 1 located approximately 120° from each of the screws 29. A metal washer 35 similar to the washers 25 is mounted on the screw 31 and is in constant engagement with the base 28, and as the screw 31 is manipulated, the bracket 27 is tilted more or less toward the edge 1a of the motor board 1, depending upon the direction of rotation of the screw 31.

The bracket 27 carries a shaft 37 which may be locked in place by a pair of screws 39, a sleeve 41 having a forwardly extending yoke 43 and a shoulder 45 being rotatable on the shaft 37. Pivotally mounted intermediate its ends on a horizontal shaft 47 carried by the yoke 43 is a supporting arm 49 for a record scanning element 51, such as an electromagnetic or similar pickup device, adapted to cooperate with the record 11, a slidable weight 53 on the supporting arm 49 serving as a means of adjusting the needle pressure on the record. To the rear end of the supporting arm 49 is fixed a steel or other magnetic member 55, and immediately below the member 55 is a housing-enclosed electromagnet 57 mounted on a bracket 59 which is fixed to the sleeve 41 for rotation therewith. The core 61 of the electromagnet 57 projects through the top of the housing and acts as a mechanical stop to the upward motion of the scanning element 51. When the scanning element is raised, the member 55 is definitely engaged by the core 61 and the scanning element is held in raised position so long as the coil of the electromagnet is energized. As soon, however, as the coil is de-energized, the scanning element 51 descends by gravity onto the record and the member 55 is raised away from the core 61.

In order to cushion the descent of the scanning element 51 onto the record, a dash-pot 63 is fixedly mounted on the shoulder 45 by means of a bracket 65, the piston 67 of the dash-pot being connected to the member 55 by a connecting rod 69. Preferably, the piston 67 is provided with a few oil grooves 71 on its periphery in order to insure an accurate air seal, and the cylinder of the dash-pot 63 may be provided with a metal insert 73 which has a tapered hole 75 therein into which the tapered end of a screw 77 may be inserted for more or less closing the hole 75 and thus controlling the rate at which air is exhausted from the cylinder through a port 79. In this manner, the rate of descent of the scanning element 51 toward the record upon de-energization of the electromagnet 57 may be controlled.

The circuit for controlling the electromagnet 57 is shown in detail in Fig. 8. Current is supplied from a suitable alternating current source through the leads 81, 83, a master switch 85, a step down transformer 87 and a variable resistor 89 to a copper oxide rectifier 91, such as a "Rectox" unit, the output of which is used to energize the electromagnet 57. The motor 3 and a pilot light 93 are also energized from the main leads 81, 83, the latter through a step-down transformer 95. Between the rectifier 91 and the electromagnet 57 are a pair of switches 97 and 99 which are arranged in parallel and control the current supplied to the electromagnet 57, a condenser 98 serving to eliminate sparking of the switches 97 and 99.

Since, with the master switch 85 closed, current will be supplied to the electromagnet 57 if either of the switches 97 or 99 is also closed, it is evident that both switches 97 and 99 must be open to de-energize the electromagnet. One of these switches, for example 97, may be manually operable either locally or at a remote point. The other switch 99 is located in close proximity to the turntable 7 and is operated by a cam 101 fixed to the under side of the turntable and arranged to engage a rubber roller 103 carried by a pivoted lever 105 the arm 106 of which is adapted to engage the spring blade 100 of the switch 99. Normally, the two contacts of the switch 99 are in engagement with each other. During each revolution of the turntable, however, the cam 101 engages the roller 103 and forces the arm 106 against the spring blade 100 to separate the switch contacts, but the electromagnet 57 still remains energized until the switch 97 is also opened. Thus, when it is desired to de-energize the electromagnet 57, the switch 97 is manually opened and held open until the cam 101 has opened the switch 99 also, whereupon the circuit to the electromagnet 57 will be opened and the scanning element 51 will be free to descend onto the record. Since the release of the scanning element in the above described operation is dependent upon the opening of the switch 99 under the control of the rotating turntable and not upon the instant at which the switch 97 is manually opened, it will be evident that the release of the scanning element is indexed with relation to the turntable, and, through the indicia 21 and the marking 23, with relation to the record 11. Thus, the record 11 may be so adjusted circumferentially on the turntable 7 that the scanning element will be released to engage any predetermined point in any turn or convolution of its spiral groove.

Fixed to the upper end of the sleeve 41 for rotation therewith is a gear 107 having a number of its teeth 109 distinctively marked, as by different colors, for example, red, yellow, green, silver, and blue. A disc 111 is also fixed to the sleeve 41 and is provided with a reduced hub portion around which is fitted a plate-like member 113, so that the latter is confined between the gear 107 and the disc 111 but is free to rotate relatively thereto about the axis of rotation of the sleeve 41. The plate 113 is provided with a cut-away portion 114, such as a notch, slot, opening, or the like superimposed over the teeth 109 and of such size as to expose to view only one of the colored teeth 109 at a time. A pawl 115 pivoted on the plate 113 has a dog thereon which is constantly urged into engagement with certain unmarked teeth of the gear 107 by means of a coil spring 117. The plate 113 is also provided with a shoulder 119 arranged to engage the head of a micrometer 121 carried in a sleeve 123 on the bracket member 27. Since the gear 107 is fixed to rotate with the supporting arm 49, it is evident that if the shoulder 119 is brought into engagement with the micrometer head, the particular tooth 109 exposed will constitute a main, rough sector or index for indexing the radial position of the supporting arm 49 and its canning element 51 with relation to the record 11. Adjustment of the micrometer 121 will then provide a vernier setting or reading to more accurately indicate the exact position of the scanning element 51 with respect to the record.

When it is desired to set the mechanism to begin reproduction at a desired point, the supporting arm 49 is removed from the spring arm 131 on a standard 133 on which the arm 49 may be supported when the machine is inactive and the record is played until that point is reached, whereupon the motor 3 is stopped by opening a switch 135 in circuit therewith while the scanning element 51 is left in contact with the record. The plate 113 is then rotated toward the head of the micrometer 121 to the nearest marked tooth 109, and the micrometer is then adjusted until its head engages the shoulder 119. During this time, light pressure is applied downwardly on the scanning element 51 so that the needle will not become dislodged from the groove, and light pressure toward the gear 107 is simultaneously applied to the free end of the pawl 115 to insure proper engagement of the pawl dog and the gear 107. The micrometer setting may then be conveniently read on the dial scale 125 by means of an indicator 127 which is actuated from the micrometer through a bell crank 129, and the reading of the indicator 127 as well as the color of the particular tooth 109 which is exposed to view is recorded.

Inasmuch as one or two revolutions of the record 11 may follow opening of the switch 135 and shutting off of the motor power, the micrometer head should be backed up a distance corresponding approximately to two grooves, or about .016". The reading thus obtained may still not be very exact, and the record should, therefore, be played from the adjusted position to ascertain whether the correct setting has been obtained. If not, the micrometer 121 is adjusted one way or the other until the proper groove has been located. Very frequently, however, the particular word desired may start from some point in the selected groove other than that at which the scanning element engages the groove. For this reason, the record 11 is made circumferentially adjustable on the turntable 7 and the position of the marking 23 with reference to the indicia 21 is also noted and recorded when the exact position in that groove has been located. A series of readings similar to the above may be made for a plurality of points in a single record and each of them recorded to provide a table like that shown in Figure 9. For example, it may be found that a passage beginning with the words "The air is" can be roughly located by exposing the green tooth 109 of the gear 107 and more exactly located when the dial scale 125 reads "160". Adjustment of the record 11 to provide the exact location of this expression may show that the mark 23 should be opposite the numeral "2" on the turntable periphery. Thus, the reading "2—green—160", as shown in the table of Figure 9, indicates that this is the proper setting wherein reproduction from the desired words will begin. In the same manner, the reading "8—silver—25" may be found to be proper where it is desired to begin reproduction from the expression "The correct time is", and so on for the other topics listed in the chart or table shown in Fig. 9. By biasing the arm 49 to swing toward the motor board edge 1a (in other words, toward the micrometer head) in the manner heretofore described, once a desired setting of the micrometer 121, the plate 113 and the record 11 have been made, it is obvious that the arm 49 will swing over the cause engagement of the shoulder 119 with the micrometer head to properly position the needle of the scanning element 51 with respect to the desired point on the record 11.

The spring 117 is preferably made sufficiently weak to allow the pawl 115 to sweep over the teeth of the gear 107 without the conventional clicking when light pressure is applied away from the gear 107 on the free end of the pawl and to allow easy operation of the plate 113 and the pawl 115 in order to make the operation of the device satisfactory when used in combination with records whose recorded grooves are eccentric to the turntable spindle. If the scanning element 51 should come down on the extreme inward position of one of these eccentrically recorded grooves, then, as the needle is moved back away from the turntable spindle, the backward motion will be absorbed by the mechanism in a slight elongation of the spring 117, and the needle will, therefore, not be forced from the groove. To facilitate a reading of the particular tooth 109 which is exposed and a reading of the dial scale 125, the pilot lamp 93 is preferably mounted on top of the bracket member 27. If desired, a second pilot lamp may be mounted in the vicinity of the turntable rim to facilitate reading of the indicia 21.

From the foregoing description, it will be apparent that I have provided indexing mechanism by means of which the exact point on a record at which a predetermined word or sound has been recorded may be accurately located. As pointed out previously, gravity alone controls the movement of the supporting arm 49 both upon the shaft 37 and upon the shaft 47. Consequently, there is no possibility of the mechanism becoming jammed, and it is not necessary to make any very accurate adjustments on either of these motions. Once the needle of the scanning element 51 is engaged in a groove of the record, the supporting arm 49 is free to move in any direction, and no springs or other constant loads are present which tend to force the needle either in one direction or the other. The shoulder 119 engages the micrometer head until the needle is actually pulled away by the record groove, and therefore there is no possibility of inaccurate lateral wavering of the supporting arm 49 when the electromagnet 57 has been de-energized. Moreover, the pin 15 accurately centers the record by removing all play between the record and the turntable spindle 5, and since the rotative position of the record with relation to the turntable is fixed, it is possible, after removing the record 11, to replace it on the turntable and bring the needle down on the exact word or sound which may be desired by pre-setting the index mechanism; and this will be true even where, as pointed out above, the recorded grooves are eccentric to the center hole of the record. It is also to be noted that, inasmuch as the beginning of descent of the scanning member 51 is indexed from the record itself, it is possible to accurately spot a fixed sound very much more readily than with mechanism which does not index from the rotative position of the turntable. Lastly, because each of the mechanical parts with the single exception of the cammed turntable switch 99 is rigidly located on the sleeve 41 to which the supporting arm 49 is rigidly coupled, it is possible to remove the index mechanism together with the arm 49 and use it in combination with any turntable with satisfactory results without accurately locating the parts with relation to each other on each new set-up.

Although I have described my invention in considerable detail, I am fully aware that many modifications thereof and changes therein may be made without departing from the scope thereof. I, therefore, desire that my invention shall not be limited except insofar as is necessitated by the prior art and by the spirit of the appended claims.

I claim as my invention:

1. In a phonograph, a supporting arm, a record scanning element carried thereby, and means associated with said supporting arm for determining the position of said scanning element with respect to the record, said means including a plurality of position determining devices one of which is adapted to approximately locate said scanning element with reference to a predetermined point on the record and another of which is adapted to more accurately locate said scanning element with reference to said point.

2. The invention set forth in claim 1 characterized in that said position determining devices comprise visible indicators.

3. The invention set forth in claim 1 characterized in that said position determining devices comprise visible indicators each having a different identifying characteristic.

4. In a phonograph, the combination of a pivoted supporting arm, a record scanning element carried thereby, a stop member adjustably associated with said supporting arm, said supporting member being constantly biased toward said stop member when said scanning element is free of the record, and means movable with said supporting arm and arranged to engage said stop member whereby to determine the position of said scanning element with respect to the record.

5. In a phonograph, the combination of a pivoted supporting arm, a record scanning element carried thereby, a micrometer associated with said supporting arm, a member rotatably mounted on the pivotal axis of said supporting arm, and means for releasably locking said member to said supporting arm for rotation therewith, said member being arranged to engage the head of said micrometer whereby to determine the position of said scanning element with respect to the record.

6. In a phonograph, the combination of a supporting arm pivotally mounted for movement across a record, a record scanning element carried by said supporting arm, a micrometer associated with said supporting arm, a member fixed to said supporting arm for movement therewith and having a plurality of sectors thereon, a second member mounted for rotation relative to said first named member and having a cut-away portion therein through which only one of said sectors may be exposed to view at a time, and means for releasably locking said second named member to said first named member whereby to cause it to move as a unit with said supporting arm, said second named member having a shoulder adapted to engage the head of said micrometer whereby to determine the position of said scanning element with respect to the record.

7. In a phonograph, the combination of a supporting arm pivotally mounted for movement across a record, a record scanning element carried thereby, a micrometer associated with said supporting arm, a gear fixed to said supporting arm for movement therewith about its pivotal axis, said gear having a plurality of variously colored teeth thereon, a member mounted for rotation about said axis relative to said supporting arm and gear, said member having a notch therein through which only one of said colored gear teeth may be exposed to view at a time and having a shoulder thereon adapted to engage the head of said micrometer, and a pawl pivotally mounted on said member and adapted to engage said gear to releasably lock said member thereto, the adjustment of said member relative to said gear serving to provide an initial setting for approximately locating said scanning element with respect to a predetermined point on said record, and the adjustment of said micrometer serving to provide a vernier setting for more precisely locating said scanning element with respect to said record point.

8. The invention set forth in claim 7 characterized in that said supporting arm is so biased that it will move in a direction to cause said shoulder to engage said micrometer head when the scanning member is free of the record.

9. In a phonograph, the combination of a turntable having a plurality of indicia thereon at regularly spaced intervals, and a record supported thereby, said record having a reference mark thereon by means of which the record may be adjusted circumferentially on said turntable with respect to said indicia.

10. In a phonograph, the combination of a turntable having a plurality of indicia thereon at regularly spaced intervals, a spirally grooved record supported thereby, said record having a reference mark thereon by means of which the record may be adjusted circumferentially on said turntable with respect to said indicia, a supporting arm pivotally mounted for movement across said record, a record scanning element carried by said supporting arm, and means associated with said supporting arm for determining the position of said scanning element with respect to a predetermined groove on said record, said means including a plurality of position determining devices one of which is adapted to approximately locate said scanning element with reference to said groove and another of which is adapted to more precisely locate said scanning element with reference to said groove, and said record being circumferentially adjustable on said turntable to provide exact location of a predetermined point in said groove with respect to said scanning member.

11. In a phonograph, the combination of a turntable having a plurality of indicia on the periphery thereof at regularly spaced intervals, a spirally grooved record supported thereby, said record having a reference mark thereon by means of which the record may be adjusted cicumferentially on said turntable with respect to said indicia, a supporting arm pivotally mounted for movement across said record, a record scanning element carried thereby, a micrometer associated with said supporting arm, a gear fixed to said supporting arm for movement therewith about its pivotal axis, said gear having a plurality of variously colored teeth thereon, a member mounted for rotation about said axis relative to said supporting arm and gear, said member having a notch therein through which only one of said colored gear teeth may be exposed to view at a time and having a shoulder thereon adapted to engage the head of said micrometer, a pawl pivotally mounted on said member and having a dog adapted to engage said gear to releasably lock said member thereto, and spring means constantly urging said dog into engagement with said gear, the adjustment of said member relative to said gear serving to provide an initial setting for approximately locating said scanning element with respect to a predetermined groove on said record, the adjustment of said micrometer serving to provide a vernier setting for more precisely locating said scanning member with respect to said groove, and the circumferential adjustment of said record serving to exactly locate a predetermined point in said groove with respect to said scanning element.

12. In a phonograph, a record scanning element supporting arm mounted on a horizontal axis for pivotal movement with respect to the record, electromagnetic means associated with said arm and adapted, when energized, to hold said scanning element out of engagement with the record, and a dashpot device also associated with said arm adapted to control the approach of said arm toward said record when said electromagnetic means is de-energized.

13. In a phonograph, the combination of a record scanning element supporting arm mounted on a horizontal axis for pivotal movement with respect to the record, electromagnetic means associated with said arm and adapted, when energized, to hold said scanning element out of engagement with the record, and an energizing circuit for said electromagnetic means, said energizing circuit including a pair of circuit controlling switches in parallel.

14. In a phonograph, the combination of a turntable, a record scanning element supporting arm mounted on a horizontal axis for pivotal movement toward and away from said turntable, an electromagnet associated with said arm and adapted, when energized, to hold said scanning element away from said turntable, an energizing circuit for said electromagnet including a pair of circuit controlling switches in parallel, one of said switches being located in proximity to said turntable, and means operable by said turntable to control the opening and closing of said one switch during each revolution of said turntable.

15. In a phonograph, the combination of a turntable, a record scanning element supporting arm mounted on a horizontal axis for pivotal movement toward and away from said turntable, an electromagnet associated with said arm and adapted, when energized, to hold said scanning element away from said turntable, an energizing circuit for said electromagnet including a pair of circuit controlling switches in parallel, one of said switches being located in proximity to said turntable, and a cam on said turntable in cooperative relation to said one switch for controlling the opening and closing thereof during each revolution of said turntable.

16. In a phonograph, the combination of a turntable, an electrically actuable member, mechanism for actuating said member, switch means for controlling said mechanism, and a cam on said turntable for controlling the opening and closing of said switch means.

17. In a phonograph, the combination of a turntable, an electrically actuable member, mechanism for actuating said member, switch means for controlling said mechanism, and a cam on said turntable in cooperative relation to said switch means, said cam being so constructed and arranged as to control the opening and closing of said switch means at least once during each revolution of the turntable.

RALPH H. HEACOCK.